(12) United States Patent
Hamilton, II et al.

(10) Patent No.: US 8,751,927 B2
(45) Date of Patent: Jun. 10, 2014

(54) SYSTEM AND METHOD FOR DYNAMIC MULTI-CONTENT CARDS

(75) Inventors: Rick A. Hamilton, II, Charlottesville, VA (US); Brian M. O'Connell, Cary, NC (US); Clifford A. Pickover, Yorktown Heights, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 12/326,370

(22) Filed: Dec. 2, 2008

(65) Prior Publication Data

US 2010/0138740 A1  Jun. 3, 2010

(51) Int. Cl.
*G06F 17/30* (2006.01)

(52) U.S. Cl.
USPC .......................................................... 715/255

(58) Field of Classification Search
USPC .......................................................... 715/255
See application file for complete search history.

(56) References Cited

U.S. PATENT DOCUMENTS

| | | | |
|---|---|---|---|
| 5,903,271 A | 5/1999 | Bardon et al. | |
| 6,661,454 B1 * | 12/2003 | Hwang et al. | 348/231.1 |
| 6,793,580 B2 | 9/2004 | Sinclair et al. | |
| 6,848,997 B1 | 2/2005 | Hashimoto et al. | |
| 7,051,086 B2 | 5/2006 | Rhoads et al. | |
| 7,139,796 B2 | 11/2006 | Rekimoto et al. | |
| 7,149,977 B2 | 12/2006 | Zaner et al. | |
| 7,246,099 B2 * | 7/2007 | Feldhahn | 705/65 |
| 2002/0054094 A1 | 5/2002 | Matsuda | |
| 2002/0090985 A1 | 7/2002 | Tochner et al. | |
| 2002/0191017 A1 | 12/2002 | Sinclair et al. | |
| 2003/0055713 A1 | 3/2003 | Pinto et al. | |
| 2003/0066877 A1 | 4/2003 | Howard et al. | |
| 2006/0271391 A1 | 11/2006 | Lee | |
| 2007/0176921 A1 | 8/2007 | Iwasaki et al. | |
| 2008/0070690 A1 * | 3/2008 | Van Luchene et al. | 463/42 |
| 2009/0064052 A1 * | 3/2009 | Mihalcheon | 715/850 |
| 2009/0106671 A1 * | 4/2009 | Olson et al. | 715/757 |

* cited by examiner

*Primary Examiner* — Laurie Ries
*Assistant Examiner* — Tionna Burke
(74) *Attorney, Agent, or Firm* — Lisa Ulrich; Roberts Mlotkowski Safran & Cole, P.C.

(57) ABSTRACT

A method and system is provided for creation and distribution of dynamic multi-content cards in a virtual universe. More specifically, the method creates a card containing contact information for viewing in a virtual universe (VU) and distribute the card in the VU. Additionally, the system includes a card selection tool configured to create a card containing contact information for viewing in a virtual universe (VU) and distribute the card to another resident in the VU.

29 Claims, 7 Drawing Sheets

SYSTEM AND METHOD FOR DYNAMIC MULTI-CONTENT CARDS

FIELD OF THE INVENTION

The present invention generally relates to computer-based virtual universes, and more specifically, to a method and system for creation and distribution of dynamic multi-content cards in a virtual universe.

BACKGROUND

Virtual universes (VUs) are rapidly becoming a popular part of today's culture. A VU is a computer-based simulated environment. Many VUs are represented using 3-D graphics and landscapes, and are populated by many thousands of users, known as "residents". Often, the VU resembles the real world such as in terms of physics, places, and landscapes.

VUs are also known as metaverses and "3D Internet." Some example VUs include: SECOND LIFE™, ENTROPIA UNIVERSE®, THE SIMS ONLINE™ and THERE™—as well as massively multiplayer online games such as EVERQUEST®, ULTIMA ONLINE™, LINEAGE® and WORLD OF WARCRAFT®. (SECOND LIFE is a trademark of Linden Research, Inc. in the United States and/or other countries. ENTROPIA UNIVERSE is a registered trademark of MindArk PE AB in the United States, other countries, or both. THE SIMS ONLINE and ULTIMA ONLINE are trademarks of Electronic Arts, Inc. in the United States, other countries, or both. THERE is a trademark of Makena Technologies, Inc. in the United States, other countries, or both. EVERQUEST is a registered trademark of Sony Corporation of America, Inc. in the United States, other countries, or both. LINEAGE is a registered trademark of NCsoft Corporation in the United States, other countries, or both. WORLD OF WARCRAFT is a registered trademark of Blizzard Entertainment, Inc. in the United States, other countries, or both.)

A VU is intended for its residents to traverse, inhabit, and interact through the use of avatars. In operation, user(s) control the avatar(s). An avatar is a graphical representation selected by the user, often taking the form of a cartoon-like human or other figure. The user's account, upon which the user can build an avatar, is tied to an inventory of assets the user owns, such as, for example, clothing, weapons, artwork, furniture, virtual pets, houses, virtual vehicles, and landmarks, amongst other items. A region is a virtual area of land within the VU, typically residing on a server's central processing unit (CPU). A user context includes a very broad range of attributes that describe the user, and which are relevant to their behavioral, search and other informational needs.

The data representation of an object or item in the VU is stored as information, e.g., as data or metadata. The object may be created by an object creator, e.g., a VU manager, a user, etc. In some VUs, larger objects are constructed of smaller objects, termed "prims" for primitive objects. These "prims" usually include boxes, prisms, spheres, cylinders, tori, tubes and/or rings. The "prims" may be rearranged, resized, rotated, twisted, tapered, dimpled and linked to create larger composite objects. The creator of such an object may then map a texture or multiple textures to the object. Texture mapping is a method of adding detail, surface texture, or color to a computer-generated graphic or 3D model. When the object is to be rendered, this information is transmitted from the VU server to the client.

An inventory of assets comprises objects or items associated with the user's individual avatar or placed by them on virtual land they own or on public land. Such objects or items may have been created by the resident from prims, purchased, or obtained for free. Examples of objects include clothing, weapons, artwork, furniture, virtual pets, houses, virtual vehicles, and landmarks, amongst other objects. Assets, avatar(s), the environment, and everything else visually represented in the VU each comprise universally unique identifiers (UUIDs) (tied to geometric data distributed to user(s) as textual coordinates), textures (distributed to user(s) as graphics files), and effects data (rendered by the user's client according to the user's preference(s) and user's device capabilities).

An element that makes virtual worlds attractive to users is the social interaction that is possible. Whether using the VU for personal or business purposes, many residents enjoy meeting other residents and creating new social relationships. It is often difficult and/or time consuming, however, to share all of the information that one resident would like to convey to another resident with the tools available in the VU (e.g., chat, gestures, etc.). Additionally, when meeting new residents who share similar traits to other residents that a given avatar has already met and socialized with, in order to convey desired information to the new resident, the conveyance must be manually repeated for each new resident that one meets.

SUMMARY OF THE INVENTION

In a first aspect of the invention, a method implemented in a computer infrastructure having computer executable code tangibly embodied on a computer readable medium being operable to create a card containing contact information for viewing in a virtual universe (VU). Additionally, the method comprises distributing the card in the VU.

In another aspect of the invention, a system comprises a card selection tool configured to create a card containing contact information for viewing in a virtual universe (VU) and distribute the card to another resident in the VU.

In an additional aspect of the invention, a computer program product comprising a computer usable storage medium having readable program code embodied in the medium is provided. The computer program product includes at least one component to create a card for distributing in a virtual universe (VU) and distribute the card in the VU. Additionally, the at least one component operable to create the card comprises at least one of the at least one component operable to provide for a selection of one of a base card and a saved card and the at least one component operable to build a custom card including custom content. Furthermore, the custom content comprises at least one of a publication, a document, a picture, a caricature, an animation, audio content, video content, a phone number, an address, an avatar name, a user name, an identification of a social network, an identification of avatars in the social network, a link to the custom content and a VU teleportation link.

In a further aspect of the invention, a method comprises providing a computer infrastructure operable to create a card containing contact information for distributing in a virtual universe (VU) and distribute the card in the VU. Furthermore, the contact information comprises at least one of a document, a picture, a publication, a caricature, an animation, audio content, video content, a phone number, an address, an avatar name, a user name, business contact information, personal contact information, a logo, an organization name, a user's image and the user's avatar's image.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
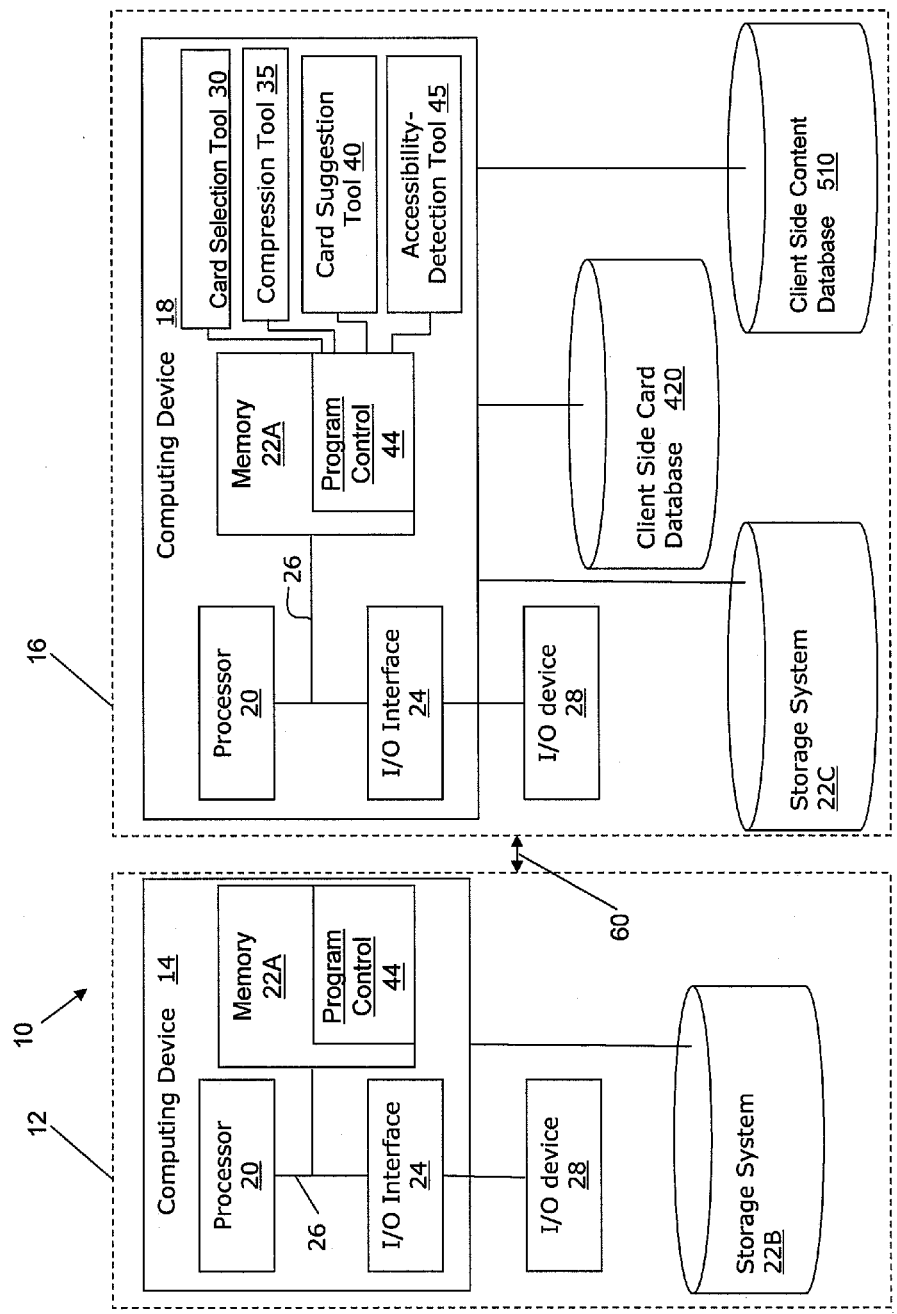
FIG. 1 shows an illustrative environment for implementing the steps in accordance with the invention.

The present invention generally relates to computer-based virtual universes, and more specifically, to a method and system for creation and distribution of dynamic, multi-content cards in a virtual universe. More specifically, the present invention provides a system for rapid delivery of customized "personal" and/or "business" cards that one VU resident can give to another resident to provide desired personal and context-based information. It should be understood that the term "card" is not intended only for business purposes or to convey business information, but is a communication of personal and/or contact information for personal or business reasons. Thus, while the term "card" is used throughout the application, it should be understood that the term is intended to encompass a card with, e.g., contact or personal information for any business, personal and/or social reasons. Content in these cards may include, for example, pictures, caricatures, audio content, video content, publications, documents, locations, phone numbers, avatar name, avatars in a social network, addresses, instructions, and/or links to such elements to name a few. The card may also include a depiction of the avatar's image and the user's (resident's) actual image. Additionally, in embodiments, the card may be a self contained virtual universe environment.

By implementing the present invention, social interaction in the VU, for example, meeting other residents and/or creating new social relationships, is improved. Moreover, by utilizing the present invention, information may be shared with another resident in the VU in a quick and efficient manner without being constrained by the communication tools available in the VU (e.g., chat, gestures, etc.). Additionally, by using, for example, saved cards, a conveyance of information may be performed without manually repeating the compilation of the information for each new resident that one meets.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes computer infrastructures 12 and 16 that can perform the processes described herein, each comprising a computing device 14 and 18, respectively. In embodiments, the computer device 14 is operable to facilitate a VU. Additionally, the computer device 18 includes a card selection tool 30, a compression tool 35, a card suggestion tool 40 and an accessibility detection tool 45. These tools are operable to facilitate a card building and selection process, a compression process, a card suggestion process and an accessibility detection process, e.g., the processes described herein.

The computing devices 14 and 18 each include a processor 20, a memory 22A, an input/output (I/O) interface 24, and a bus 26. The memory 22A can include local memory employed during actual execution of program code, bulk storage, and cache memories that provide temporary storage of at least some program code in order to reduce the number of times code must be retrieved from bulk storage during execution.

Further, the computing devices 14 and 18 are each in communication with external I/O device/resource 28. The external I/O device/resource 28 may be keyboards, displays, pointing devices, etc. The I/O device 28 can interact with the computing device 14 and/or computing device 18, or any device that enables the computing device 14 and computing device 18 to communicate with each other and to communicate with one or more other computing devices using any type of communications link. Additionally, in embodiments, the computing device 14 includes a storage system 22B and the computing device 18 includes a storage system 22C. Further, in embodiments, computing device 18 includes a client side card database 420 and a client side content database 510.

With each of the computing devices 14 and 18, the processor 20 executes computer program code (e.g., program control 44), which is stored in memory 22A and/or storage system 22B or 22C, respectively. While executing computer program code, the processor 20 can read and/or write data to/from memory 22A, storage system 22B (or 22C), and/or I/O interface 24. The bus 26 provides a communications links between each of the components in the computing device 14 and the computing device 18, respectively.

The computing devices 14 and 18 can comprise any general purpose computing article of manufacture capable of executing computer program code installed thereon (e.g., a personal computer, server, handheld device, etc.). However, it is understood that the computing devices 14 and 18 are only representative of various possible equivalent computing devices that may perform the processes described herein. To this extent, in embodiments, the functionality provided by the computing devices 14 and 18 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructures 12 and 16 are only illustrative of various types of computer infrastructures for implementing the invention. For example, in embodiments, the computer infrastructures 12 and 16 may comprise one computing device or more than two computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices of the computer infrastructure 16 external to computer infrastructure 12 using any type of communications link 60. The communications link 60 can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the computer infrastructure 16 may communicate, via communications link 60, with computer infrastructure 12, which is operating the VU. However, the invention contemplates that the computer infrastructure 16 may operate the card selection tool 30, the compression tool 35, the card suggestion tool 40 and the accessibility detection tool 45, and operate the VU.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Base Card

Figure 2:
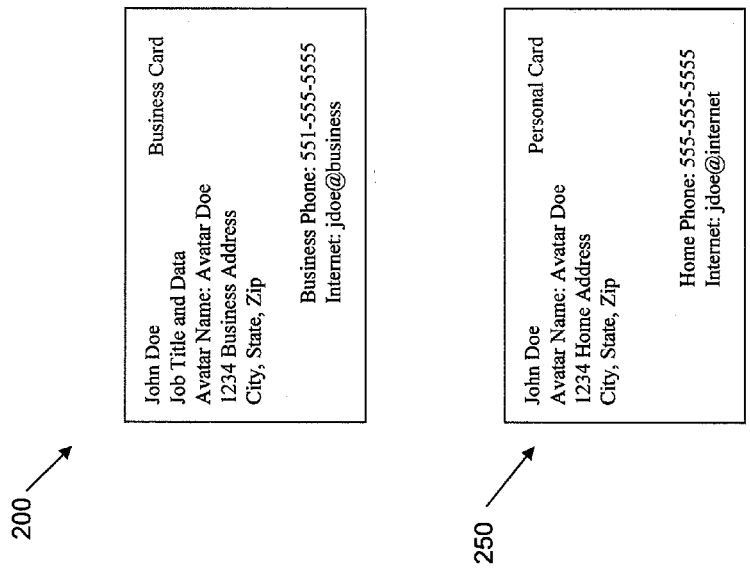
FIG. 2 shows an exemplary "business" card and an exemplary "personal" card in accordance with the invention.

FIG. 2 provides an example of one base "business" card 200 and one base "personal" card 250 held in the inventory of avatar John Doe. As shown in FIG. 2, the exemplary base "business" card 200 may display information including, for example, a name, a job title, a business address, a business logo, a business telephone number, a business facsimile number, an internet address, an email address and/or an avatar name, amongst other information. Additionally, the exemplary base "personal" card 250 may display information including, for example, a name, an address, a telephone number, a facsimile number, an internet address, an email address and/or an avatar name, amongst other information. In embodiments, the process of giving a "personal" or "business" card to another resident would begin with the giving avatar having in their inventory one or more "base" cards. Such base card(s) could simply be an electronic version of a standard card and may contain no additional content, such as, for example, a visual content identifier, accessibility features, embedded controls, all of which are discussed further below.

In embodiments, for example, these base cards 200 and/or 250 may be selected from a catalog of available electronic cards, scanned images of existing physical cards, created using a client-side interface or card generation program, or use other analogous creation methods. Another embodiment may include a generic base card that would simply act as a stub/link to allow the giving avatar to begin the process of creating a new custom card.

Flow Diagrams

FIGS. 3-6 show exemplary flows for performing aspects of the present invention. The steps of FIGS. 3-6 may be implemented in the environment of FIG. 1, for example. The flow diagrams may equally represent high-level block diagrams of the invention. The flowcharts and/or block diagrams in FIGS. 3-6 illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 3:
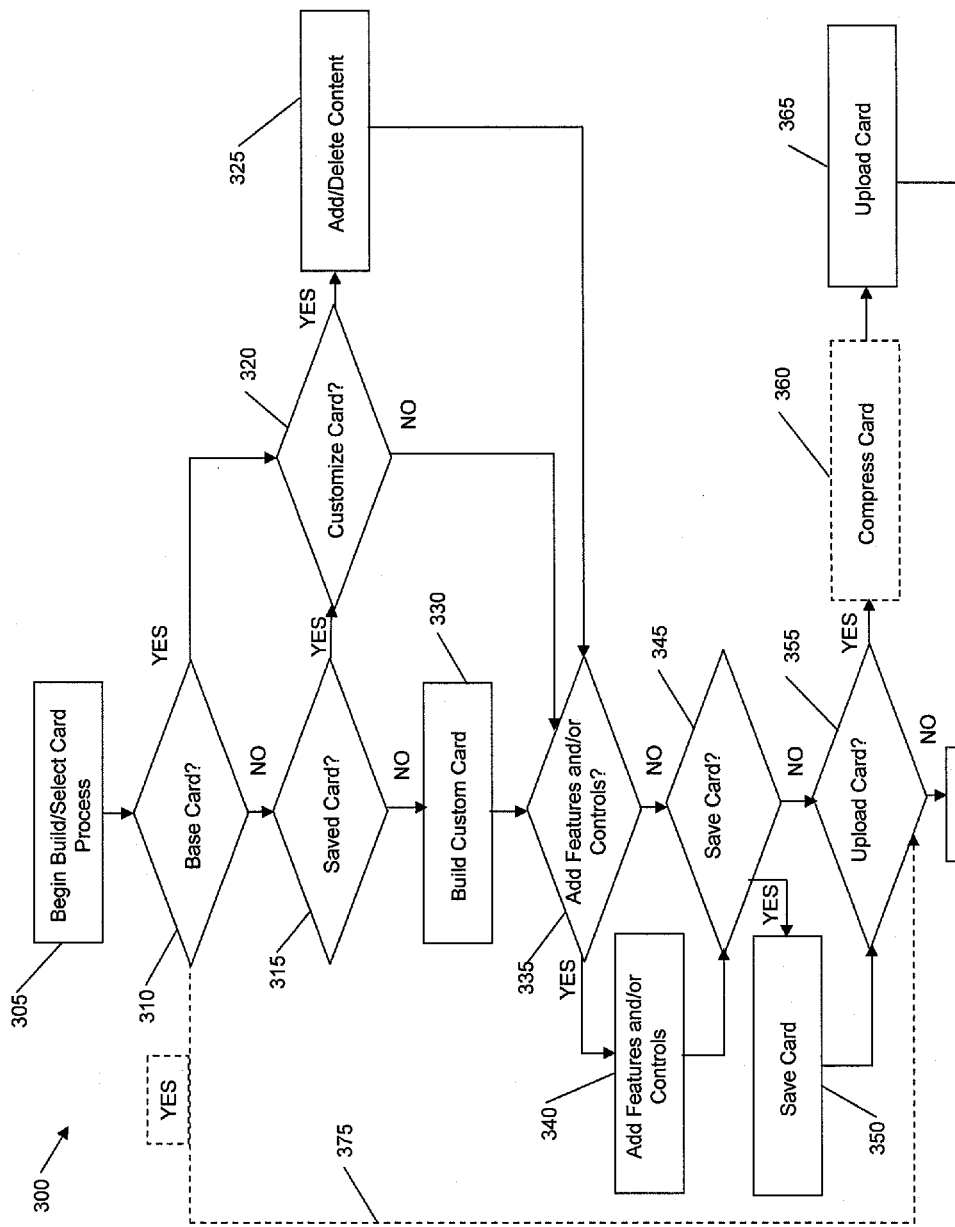
FIGS. 3-6 show exemplary flow diagrams in accordance with aspects of the invention.

FIG. 3 shows an exemplary flow 300 for performing steps of the invention. At step 305, a user begins a card building/selecting process. At step 310, the card selection tool determines if a user has selected to use a base card. If, at step 310, the user has chosen to use a base card, the process proceeds to step 320. If, at step 310, the user has chosen to not use a base card, the process proceeds to step 315. As shown by the dashed line 375, in an alternative embodiment, if, at step 310, the user has chosen to use a base card, the process proceeds directly to step 355, where a determination to upload the card to a server for distribution is made. That is, the base card is distributed in the VU without providing the user an opportunity to add and/or delete content to and/or from the base card and without providing the user an opportunity to add features and/or controls to the base card. By bypassing these steps, this would facilitate a faster card distribution transaction.

At step 315, the card selection tool determines if a user has selected to use a saved card. If, at step 315, the user has chosen to use a saved card, the process proceeds to step 320. If, at step 315, the user has chosen to not use a saved card, the process proceeds to step 330.

At step 320, the card selection tool determines if a user has selected to customize either the base card or the saved card. If, at step 320, the user has selected to customize the base card or the saved card, at step 325, the user may add and/or delete content of the base card or saved card. If, at step 320, the user has selected to not customize the base card or the saved card, the process proceeds at step 335.

At step 330, the user may utilize the card selection tool to build a custom card. As described herein, the process of building a custom card may include selecting a base card (or, in embodiments, a saved card) and adding, for example, custom content to the base card.

At step 335, the card selection tool determines whether a user would like to add features and/or controls. For example, a user may add a visual content indicator, accessibility features, card controls, connected/disconnected card features, amongst other features and controls. If, at step 335, the user opts to add features and/or controls, at step 340, the card selection tool adds features and/or controls to the card.

At step 345, a determination is made, as to whether the user would like to save their card. If, at step 345, it is determined that the user would like to save their card, at step 350, the card is saved, for example, in a database, e.g., the client side card database, and the process proceeds to step 355. If, at step 345, it is determined that the user would not like to save their card, the process proceeds to step 355.

At step 355, a determination is made as to whether the user would like to upload their card, e.g., for distribution to another avatar or VU resident. If, at step 355, the user decides to not upload their card, the process proceeds to step 370, where the process ends. If, at step 355, the user decides to upload their card, the process proceeds to step 360. At optional step 360, the card is compressed, e.g., by the compression tool. It should be understood that, in embodiments, step 360 is an optional step, as indicated by the dashed lines. At step 365, the card is uploaded, e.g., to a server for distribution to other avatars or VU residents. At step 370, the process ends.

It should be understood, that while the steps have been described as occurring in a particular order, the invention contemplates that the steps may be performed in other orders. For example, step 310 may occur after step 315. Furthermore, the invention contemplates that, in embodiments, steps may be implied or omitted while still remaining true to this invention.

Base Card Selection

Figure 4:
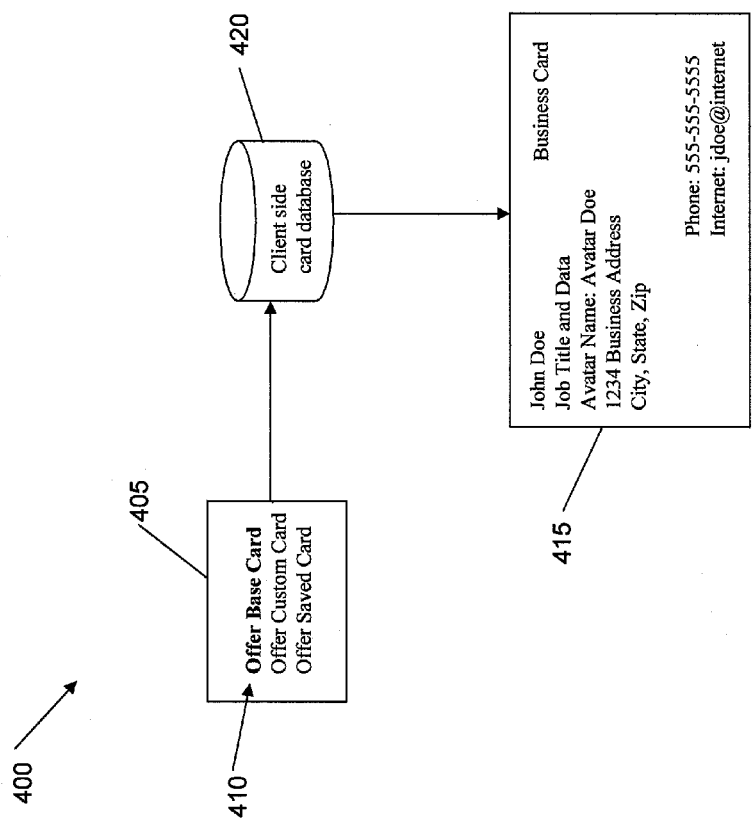

FIG. 4 shows an exemplary flow diagram 400 for carrying out steps in accordance with the invention. The flow diagram may equally represent a high-level block diagram of the invention. As shown in FIG. 4, in embodiments, upon a VU user (or resident) deciding to give a card, the card selection tool 30 may present to the user of the giving avatar a selection box 405, e.g., a drop-down menu, containing available options provided on a display, e.g., I/O device 28. In this example, the user of the giving avatar may have the following options: 1) "offer base card;" 2) "offer custom card;" and 3) "offer saved card." In embodiments, selecting the "offer base card" option may direct the card selection tool 30 to offer a base card as it exists in the giving avatar's inventory (for example, in the client side card database 420 or in remote database, e.g., the storage system 22B) with, e.g., no modifications or additional content. Selecting the "offer custom card" option may direct the card selection tool 30 to provide additional selection menus, e.g., drop-down menus, to the giving avatar to accommodate a build of customized card content, which is discussed further below. Selecting the "offer saved card" option may direct the card selection tool 30 to allow the giving avatar to retrieve an existing custom card (for example, from the client side card database 420 or from a remote database, e.g., storage system 22B) and give it to a receiving avatar as-is, or further customize the card prior to giving it to the receiving avatar (which is discussed further below).

Further, as shown in the example of FIG. 4, the "Offer Base Card" 410 selection is made from the menu depicted in the selection box 405, which is indicated, for example, by highlighting or bolding the selection. In response to the selection, the card selection tool 30 may retrieve the base card 415 from, for example, the client side card database 420 and/or a remote database, e.g., storage system 22B, and may give the card to the receiving avatar.

Custom Card Selection/Creation

Figure 5:
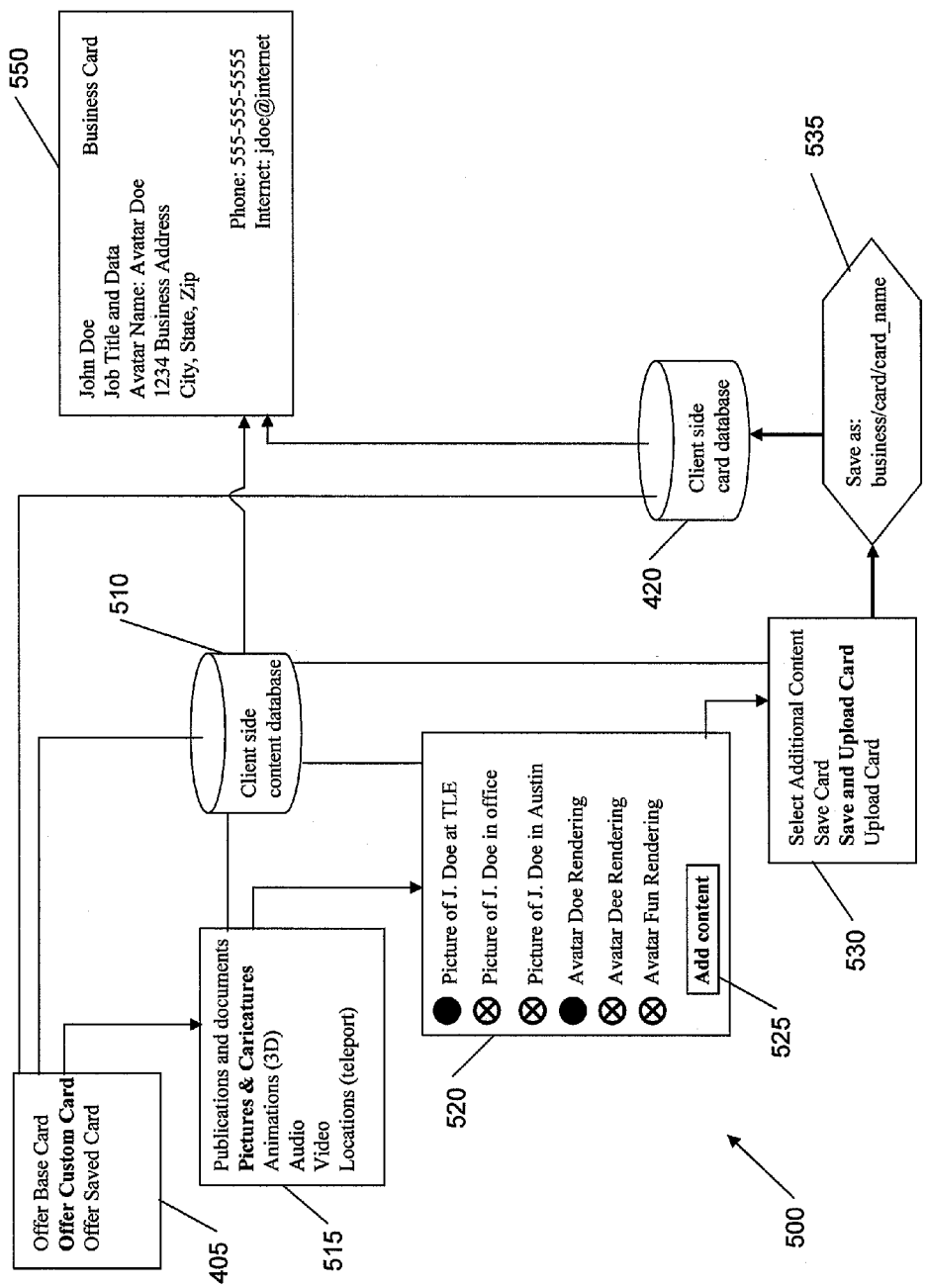

FIG. 5 shows an exemplary flow diagram 500 for a custom card selection process. The flow diagram may equally represent a high-level block diagram of the invention. With this embodiment, when a VU user selects the "offer custom card" option from the selection box 405 menu, the card selection tool 30 may query, for example, a client side card database 420 and/or a remote database, e.g., storage system 22B for the base card information. Additionally, the card selection tool 30 may query, for example, a client side content database 510 and/or a remote database, e.g., storage system 22B, or other such data repository for available content data. Content to be shared via the virtual card may be loaded into, e.g., the client side content database 510 or repository using conventional methods, for example, scanning, OCR, etc., and all loaded content data would then be available as content for the custom virtual card. Additionally, in embodiments, data that already exists elsewhere on the client side system, e.g., the memory 22A and/or the storage system 22C of the computing infrastructure 16, may be accessed via a link in the repository rather than via a loaded copy. In embodiments, the client side content database 510 and client side card database 420 may be separate database or may be a single database. Additionally, the client side content database 510 and client side card database 420 may both be contained in the storage system 22C. Additionally, the invention contemplates that the information may be located in a remote database, e.g., the storage system 22B.

Upon completion of the query of the content database, the card selection tool 30 may provide a card customization menu 515 to the giving avatar's user containing available content categories, e.g., in a drop-down window. As shown in FIG. 5, with this non-limiting exemplary embodiment, available content categories may include 1) publications and documents; 2) pictures and caricatures; 3) animations; 4) audio; 5) video; and 6) locations (to, e.g., teleport to in the VU), amongst other content categories.

Continuing with the example of FIG. 5, the giving avatar's user has selected, via the card selection tool 30 and the card customization menu 515, to include content for the custom card available in the pictures and caricatures category (as indicated via, for example, bolding or highlighting of the selection). Upon the user selecting this category, the card selection tool 30 may provide a secondary menu 520, e.g., a drop-down menu, containing a list of all available content for this category to the giving avatar. As shown in FIG. 5, with this exemplary embodiment, there are six pictures and caricatures available for the giving avatar to choose from. The giving avatar's user, via the card selection tool 30 and the secondary menu 520, has selected "Picture of J. Doe at TLE" and "Avatar Doe Rendering" to be included with this custom card. Upon making all selections in this category, the giving avatar's user may choose to add the content selection to the card, e.g., by selecting or highlighting an add content button 525.

In response to selecting the add content button 525, the card selection tool 30 may provide an option selection box 530, which may contain as options to the giving avatar's user: 1) "select additional content;" 2) "save card;" 3) "save and upload card;" and 4) "upload card," amongst other options. In embodiments, in response to selecting the "select additional content" option, the card selection tool 30 would write and/or cache the selections made in the current selection menu in, for example, the client side card database 420 and/or a remote database, e.g., storage system 22B and then return the user to the category selection menu 515. At this point, the user may choose another category of the category selection menu 515 to select content from, for example, the video menu, which would direct the card selection tool 30 to present the giving avatar's user with available video content to include with the card.

In response to selecting the "save card" option, the card selection tool 30 would save the card 550 in its current state to, for example, the client side card database 420 or a remote database, e.g., storage system 22B. If no card name currently exists for this card 550, the card selection tool 30 may display a "save as" prompt 535. In response to selecting the "save and upload card" option, the card selection tool 30 would provide the save function as described above, but would also initiate an uploading, and in embodiments, a compression (via, e.g., the compression tool 35) of the card 550 in its current state. In response to selecting the "upload card" option, the card selection tool 30 would initiate an uploading, and in embodiments, a compression (via, e.g., the compression tool 35) and upload of the card 550, e.g., to a server, in its current state, but would not save the card 550.

In embodiments, the content compression may take place within a database, e.g., the client side card database 420 or the storage system 22B, or in a compression tool 35 outside of the database, e.g., the client side card database 420 or the storage system 22B, as some database and repository programs may not offer compression. For example, in embodiments, the compression tool 35 may use existing programs to perform compression including, for example, in zip, compress, tar, and/or pax compression formats, amongst others compression formats.

Additionally, in embodiments, the upload of the card data to a server may occur using standard communication ports and protocols, e.g., file transfer protocol (FTP). The card selection tool 30 may embed or attach the uploaded data to the card. The uploaded content, once received by the target resident may then be stored in inventory on the server, e.g., storage system 22B, or may be down-loaded to the receiving resident's client side system (not shown) and linked to the card in the receiving residents inventory.

Saved Card Selection

Figure 6:
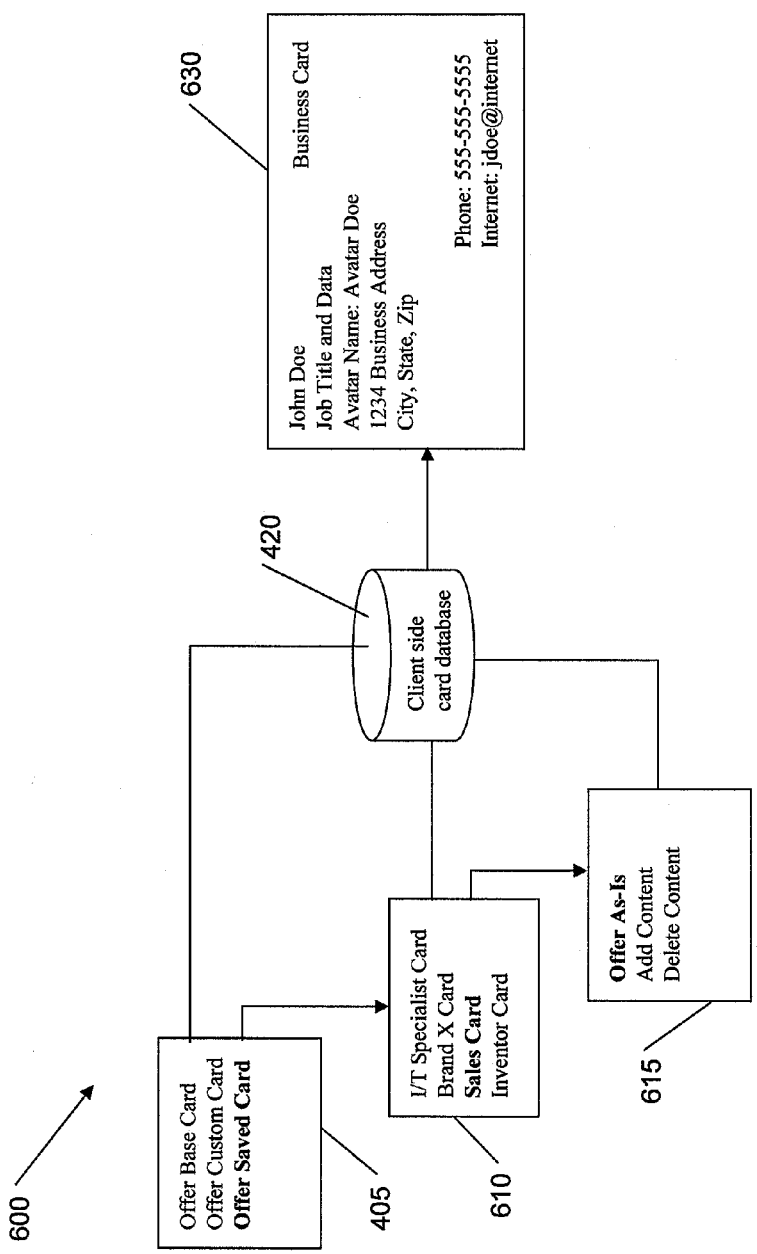

FIG. 6 shows an exemplary flow diagram 600 for using a saved card according to an aspect of the invention. The flow diagram may equally represent a high-level block diagram of the invention. With this example, the giving avatar's user already has a card in, e.g., the client side card database 420 that is suitable for the current target resident. As shown in FIG. 6, using the card selection tool 30 and the card selection menu 405, a giving avatar's user has selected the "offer saved card" option. In response, the card selection tool 30 may query, for example, the client side card database 420 and provide a list of available saved cards 610 (e.g., including bundled content). The giving avatar's user may select a desired card and the card selection tool 30 may present a saved card modification menu 615 having as options: 1) "offer as-is;" 2) "add content;" and 3) "delete content," amongst other options. The "offer as-is" option would offer the card as extracted from the database, for example, the client side card database 420 and/or a remote database, e.g., storage system 22B, in an unaltered state. The "add content" option would allow the giving avatar's user to add content, e.g., to the bundled content already included in the saved card prior to giving the card to the target resident. The "delete content" option would allow the giving avatar's user to remove content from the bundled content included in the saved card prior to giving the card to the target resident. Additionally, as described above, the card selection tool 30 may direct the compression tool 35 to compress the card content, and may upload the card 630 to a server for presentation to the receiving avatar. Also, in embodiments, the card selection tool 30 may provide a save or save as menu (not shown) to the giving avatar's user if the giving avatar's user modified a saved card prior to giving it to the target resident.

Visual Content Indicator

Figure 7:
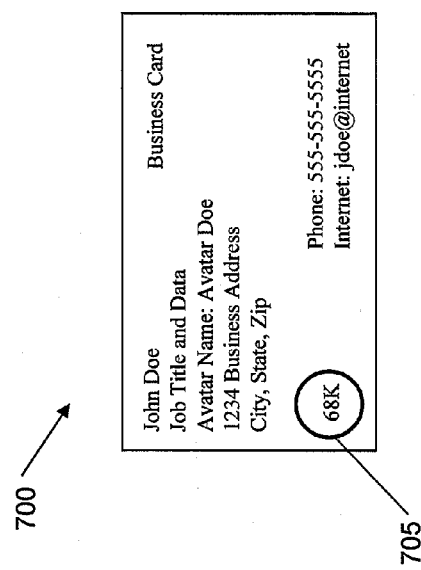
FIG. 7 shows an exemplary visual content indicator in accordance with an aspect of the invention.

FIG. 7 shows an exemplary card 700 including a visual content indicator 705 according to an aspect of the invention. In the example of FIG. 7, as indicated by the visual content indicator 705, the giving avatar has created, e.g., a custom card 700 having a total size of 68K. In embodiments, the card selection tool 30 may include with a completed card, e.g., a custom card, the visual content indicator 705 indicating a total size of the embedded or attached content of the card to be accepted. This may be helpful for the potential receiving resident in deciding whether or not to accept the card being offered. That is, if the visual content indicator 705 indicates that the card contains, for example, a large amount of data, e.g., a large amount of embedded or attached content, a receiving avatar may not be interested in downloading this large amount of data, and thus, may not be interested in accepting the card.

Card Suggestion

Additionally, in embodiments, the card suggestion tool 40 may suggest a specific card for transfer to a resident by the giving avatar's user based, e.g., on context and information known about the giving resident and/or the target resident. For example, the card suggestion tool 40 may detect that the user is operating a "work" avatar, and may detect that the user meets another resident also operating a work avatar. Thus, with this example, the card suggestion tool 40 may direct the card selection tool 30 to default to the base card.

Embedded Controls

In embodiments, the card selection tool 30 may embed controls in the card such that after the transfer of the card to the receiving avatar: 1) the card can be given to another avatar; 2) the card cannot be given to another avatar; 3) the card can be copied; 4) the card can be copy-protected; and/or 5) the original giving avatar is informed when the card is copied or given away (for example, avatar A has given a copy of your card "card C" to avatar B), amongst other controls. With this aspect of the invention, a user may control and/or track the downstream proliferation of their card between other residents in the VU to, for example, remain informed as to whom their card has been distributed to or shared with.

Immersive VU Card

In embodiments, the card may contain an immersive VU experience. For example, with an immersive VU card, the recipient of the card may choose to "enter" the card, which would provide a VU environment that the recipient may traverse. This card VU environment may show, for example, hobbies, certificates, photos, and other items related to the card owner. Additionally, the card VU environment may contain, for example, chairs to sit in and photos on the walls. To implement the immersive VU card, the card selection tool 30 may embed pointers to actual custom-designed regions of the VU within the card. In this sense, the card may act in a manner similar to traditional teleportation in VUs.

Inter-Card Communication

According to a further aspect of the invention, in embodiments, the card may provide for inter-card communication. For example, when the cards of two avatars make contact, the cards may exchange items and/or information, e.g., a vase of flowers may enter a recipient's card. The term "enter" may indicate that the items and/or information are stored in the recipient's inventory or in a custom-designed VU region described, for example, with the immersive VU card experience.

Accessibility Features

In further embodiments, cards may include accessibility features. For example, if user 1 gives a card to user 2 who is visually handicapped, the card selection tool 30 may enlarge the font on the card as received by user 2. In embodiments, the accessibility-detection tool 45 may detect an accessibility tag associated with user 2. In response, the accessibility-detection tool 45 may direct the card selection tool 30 to provide the indicated accessibility features, e.g., larger text, audio content, etc. on and/or within the card.

Disconnected/Connected Cards

Additionally, according to a further aspect of the invention, the card selection tool 30 may provide for both disconnected (static) cards and connected (dynamic) cards. Disconnected cards are those whose contents are static or "frozen." By this, it is meant that the content of the card will not change over time. Thus, the content that is given at the point of transfer of the card cannot be updated by the giving avatar subsequent to the transfer. Alternatively, connected cards are those with dynamic or fluid content. By this, it is meant that content segments, for example, either in part or in whole, may be updated by the giving avatar, i.e., the issuer of the card, subsequent to the moment of transfer. In embodiments, the giving avatar may be the original giving avatar or may be a downstream giving avatar (e.g., an avatar who is giving away a card originally created by another avatar).

Other Embodiments

According to a further aspect of the invention, in embodiments, the present invention provides for content viewing both within the VU and outside the VU. That is, content included with a card could be viewed real-time in the VU, or, with the exception of VU specific 3D content (e.g., an immersive card), could be viewed off-line on the resident's client side system. In other words, the present invention allows for convenient transfer of such cards between the VU and the client machine.

In embodiments, if a custom card is initiated based on a generic base card, an option would also be presented to enter the basic text on the face of the card. Further, in embodiments, the invention may include a client side interface, e.g., I/O device 28 of computing infrastructure 16, such that the user could create, edit, and manage cards and content independent of the VU environment.

Additionally, while the invention has been described using the card selection tool 30, the compression tool 35, the card suggestion tool 40 and the accessibility detection tool 45, the invention contemplates that any of the operations performed by the card selection tool 30, the compression tool 35, the card suggestion tool 40 and/or the accessibility detection tool 45 may be performed manually by a user (e.g., a VU manager, an advertiser or a service provider). For example, in embodiments, a VU manager may perform the compression manually (e.g., outside of the compression tool 35).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable medium being operable to:
    create a card containing contact information for viewing in a virtual universe (VU) and which includes an immersive VU feature which permits a user of the card to enter a VU environment within the card, the immersive VU feature includes a card selection tool that embeds pointers to custom-designed regions of the VU environment within the card, wherein the VU environment within the card is different from the VU in which the card is distributed;
    select the card for distribution in the VU from a giving avatar to a receiving avatar;
    distribute the selected card in the VU to the receiving avatar,
    wherein residents of the VU view, select, and distribute the card while traversing, inhabiting, and interacting through the use of the giving and receiving avatars in the VU.

2. The method of claim 1, wherein the creating the card comprises creating a custom card including custom content, wherein the custom content comprises at least one of: a publication; a document; a picture; a caricature; an animation; audio content; video content; a phone number; an address; an avatar name; a user name; an identification of a social network; an identification of avatars in the social network; a link to the custom content; and a VU teleportation link.

3. The method of claim 2, further comprising saving the custom card in a database.

4. The method of claim 1, wherein the creating the card comprises providing one of a base card and a saved card.

5. The method of claim 4, wherein the providing the saved card comprises providing a list of saved cards stored in a memory storage.

6. The method of claim 4, further comprising creating an edited card by at least one of adding content to the base card or the saved card and deleting the content from the base card or the saved card.

7. The method of claim 6, wherein the content comprises at least one of: a publication; a document; a picture; a caricature; an animation; audio content; video content; a phone number; an address; an avatar name; a user name; an identification of a social network; an identification of avatars in the social network; a link to the custom content; and a VU teleportation link.

8. The method of claim 6, further comprising saving the edited card in a memory storage.

9. The method of claim 1, further comprising adding at least one of features and controls to the card.

10. The method of claim 9, wherein the at least one of features and controls comprise: an accessibility feature; a visual content indicator; an embedded distribution control; a connected-card control; a disconnected-card control; an intra-card communication control; and an immersive VU feature.

11. The method of claim 1, further comprising suggesting the card to be distributed based on at least one of context of the giving avatar and context of the receiving avatar.

12. The method of claim 1, further comprising at least one of compressing the card and uploading the card to a VU server.

13. The method of claim 1, wherein the contact information comprises at least one of: a document; a picture; a publication; a caricature; an animation; audio content; video content; a phone number; an address; an avatar name; a user name; business contact information; personal contact information; a logo; an organization name; a user's image; and the user's avatar's image.

14. The method of claim 1, wherein a service provider at least one of creates, maintains, deploys and supports the computer infrastructure that performs the steps of claim 1.

15. The method of claim 1, wherein steps of claim 1 are provided by a service provider on a subscription, advertising, and/or fee basis.

16. A system, comprising:
    a processor, a computer readable memory, and a computer readable storage media;
    first program instructions to create a card containing contact information for viewing in a virtual universe (VU) and which includes an immersive VU feature which permits a user of the card to enter a VU environment within the card, the immersive VU feature includes a card selection tool that embeds pointers to custom-designed regions of the VU environment within the card, wherein the VU environment within the card is different from the VU in which the card is distributed;
    second program instructions to select the card for distribution in the VU from a giving avatar to a receiving avatar; and
    third program instructions to distribute the selected card to the receiving avatar in the VU,
    wherein residents of the VU view, select, and distribute the card while traversing, inhabiting, and interacting through the use of the giving and receiving avatars in the VU; and
    the first, second, and third program instructions are stored on the computer readable storage media for execution by the processor via the computer readable memory.

17. The system of claim 16, further comprising program instructions to:

detect at least one of a context of the giving avatar and a context of the receiving avatar; and
suggest the card based on the at least one of the giving avatar's context and the receiving avatar's context.

18. The system of claim 16, further comprising program instructions to compress the card for viewing in the VU.

19. The system of claim 16, further comprising program instructions to:
detect an accessibility need of the receiving avatar; and
configure the card to aid the receiving avatar with the accessibility need.

20. The system of claim 16, wherein a service provider at least one of creates, maintains, deploys and supports the system.

21. The system of claim 16, wherein the system is operable on software, hardware or a combination of software and hardware.

22. A computer program product comprising a computer storage device comprising a memory embodying readable program code, the computer program product includes at least one component operable to:
create a card for distributing in a virtual universe (VU) and which includes an immersive VU feature which permits a user of the card to enter a VU environment within the card, the immersive VU feature includes a card selection tool that embeds pointers to custom-designed regions of within the VU environment of the card, wherein:
the VU environment within the card is different from the VU in which the card is distributed;
the card is a static card whose contents do not change over time and content in the card given at a point of transfer cannot be updated by a giving avatar subsequent to the transfer;
the card selection tool embeds controls in the card such that after transferring the card to another avatar, the card can be given to other avatars, the card is copy-protected, and an original giving avatar is informed when the card is copied or given away to the other avatars;
select the card for distribution in the VU from the giving avatar to a receiving avatar, wherein the card is selected from the group consisting of a base card, a custom card, an edited card, and a saved card;
distribute the selected card in the VU to the receiving avatar;
wherein the at least one component is further operable to:
build the custom card including custom content, wherein the custom content comprises at least one of: a publication; a document; a picture; a caricature; an animation; audio content; video content; a phone number; an address; an avatar name; a user name; an identification of a social network; an identification of avatars in the social network; a link to the custom content; and a VU teleportation link; and
residents of the VU select and distribute the card while traversing, inhabiting, and interacting through the use of giving and receiving avatars in the VU; and
initiate inter-card communication between the card and another card associated with a different avatar, wherein the card and the another card exchange information and items stored in the card and the another card.

23. A method comprising:
providing a computer infrastructure operable to:
create a card containing contact information for distributing in a virtual universe (VU) and which includes an immersive VU feature which permits a user of the card to enter a VU environment within the card, the immersive VU feature includes a card selection tool that embeds pointers to custom-designed regions within the VU environment of the card, wherein:
the VU environment within the card is different from the VU in which the card is distributed;
the card selection tool embeds controls in the card such that after transferring the card to another avatar, the card can be given to other avatars, the card is copy-protected, and an original giving avatar is informed when the card is copied or given away to the other avatars;
select the card for distribution in the VU from the giving avatar to a receiving avatar, wherein the card is selected from the group consisting of a base card, a custom card, an edited card, and a saved card;
distribute the selected card in the VU, wherein the contact information comprises at least one of: a document; a picture; a publication; a caricature; an animation; audio content; video content; a phone number; an address; an avatar name; a user name; business contact information; personal contact information; a logo; an organization name; a user's image; and the user's avatar's image,
wherein residents of the VU select and distribute the card while traversing, inhabiting, and interacting through the use of giving and receiving avatars in the VU; and
initiate an accessibility feature that uses an accessibility tag associated with a particular user that enlarges font on the card and increases sound for audio features of the card.

24. The method of claim 23, wherein a service provider at least one of creates, maintains, deploys and supports the computer infrastructure.

25. The method of claim 23, wherein steps of claim 23 are provided by a service provider on a subscription, advertising, and/or fee basis.

26. The method of claim 1, wherein:
the VU comprises a computer-based, three-dimensional environment, where the residents of the VU interact with one another and move through the environment using the giving and receiving avatars;
each of the one or more residents have an account upon which the each of the one or more residents can build the giving or receiving avatar, and the account is tied to an inventory of assets for the corresponding giving or receiving avatar; and
the distribute the card in the VU comprises the giving avatar of a first resident giving a copy of the card to the receiving avatar of a second resident in the three-dimensional environment such that a copy of the card is placed in the inventory of assets associated with the receiving avatar.

27. The method of claim 26, further comprising:
adding features and controls to the card, wherein the features and controls comprise a visual content indicator that the first resident places on the card; and
suggesting a type of card to be distributed to the second resident from the first resident based on a context of the receiving avatar,
wherein:
the visual content indicator is a visual indicator on the card that provides the second resident with information comprising a total memory size of the card; and
the context comprises a type of avatar being used by the second resident.

28. The method of claim 27, further comprising informing the first resident when the card is copied or given from the receiving avatar to another resident's avatar,
wherein:

the card is a connected card with dynamic or fluid content such that when the first resident updates the card, the copy of the card placed in the inventory of assets associated with the receiving avatar and the card copied or given to the another resident's avatar is also updated; and the card can be viewed in real time.

29. The method of claim 26, wherein the receiving is teleported to and traverses within the VU environment of the card.

\* \* \* \* \*